(12) United States Patent
Kaszczuk et al.

(10) Patent No.: US 6,334,676 B1
(45) Date of Patent: Jan. 1, 2002

(54) USING COLORANT PRECURSORS AND REACTANTS IN MICROFLUIDIC PRINTING

(75) Inventors: Linda A. Kaszczuk, Webster; David L. Cole; Xin Wen, both of Rochester; Richard A. Landholm, Canandaigua; Anthony R. Lubinsky, Penfield, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/065,283

(22) Filed: Apr. 23, 1998

Related U.S. Application Data

(60) Provisional application No. 60/060,454, filed on Sep. 29, 1997.

(51) Int. Cl.[7] ........................................... B41J 2/17
(52) U.S. Cl. ..................... 347/96; 347/100; 346/140.1
(58) Field of Search ..................... 346/140.1; 347/96, 347/43, 100, 101

(56) References Cited

U.S. PATENT DOCUMENTS

| | | | | |
|---|---|---|---|---|
| 4,555,478 A | * | 11/1985 | Reczek et al. | 430/367 |
| 5,011,811 A | * | 4/1991 | Shuttleworth et al. | 503/201 |
| 5,614,013 A | * | 3/1997 | Mitchell et al. | 106/494 |
| 6,057,864 A | * | 5/2000 | Wen | 346/140.1 |

* cited by examiner

Primary Examiner—John Barlow
Assistant Examiner—Manish S Shah
(74) Attorney, Agent, or Firm—Raymond L. Owens

(57) ABSTRACT

In a method for microfluidic printing of colored images on a receiver, including providing a first set of reservoirs containing colorant precursors for different colors; providing at least one reservoir containing a reactant; and reacting the colorant precursors and reactant(s) to provide colored pixels of the desired colors.

22 Claims, 4 Drawing Sheets

USING COLORANT PRECURSORS AND REACTANTS IN MICROFLUIDIC PRINTING

CROSS REFERENCE TO RELATED APPLICATIONS

This application claims benefit of Provisional No. 60/060,454 filed Sep. 29, 1997.

Reference is made to commonly assigned U.S. patent application Ser. No. 08/868,426, filed Jun. 3, 1997 entitled "Continuous Tone Microfluidic Printing"; U.S. patent application Ser. No. 08/868,104, filed Jun. 3, 1997 entitled "Image Producing Apparatus for Microfluidic Printing"; U.S. patent application Serial No. 08/868,100, filed Jun. 3, 1997 entitled "Improved Image Producing Apparatus for Uniform Microfluidic Printing"; U.S. patent application Ser. No. 08/868,416, filed Jun. 3, 1997 entitled "Microfluidic Printing on Receiver"; U.S. patent application Ser. No. 08/868,102, filed Jun. 3, 1997 entitled "Microfluidic Printing With Ink Volume Control"; and U.S. patent application Ser. No. 08/868,477, filed Jun. 3, 1997 entitled "Microfluidic Printing With Ink Flow Regulation." The disclosure of these related applications is incorporated herein by reference.

FIELD OF THE INVENTION

The present invention relates to printing digital images by microfluidic printing of colored images formed by chemical reactions.

BACKGROUND OF THE INVENTION

Microfluidic pumping, and dispensing of liquid chemical reagents is the subject of three U.S. Pat. No. 5,585,069; 5,593,838; and 5,603,351, all assigned to the David Sarnoff Research Center, Inc. The system uses an array of micron sized reservoirs, with connecting microchannels and reaction cells etched into a substrate. Electrokinetic pumps comprising electrically activated electrodes within the microchannels proved the propulsive forces to move the liquid reagents within the system. The electrokinetic pump, which is also known as an electroosmotic pump, has been disclosed by Dasgupta et al., see "Electroosmosis: A Reliable Fluid Propulsion System for Flow Injection Analyses," Anal. Chem. 66, pp 1792–1798 (1994). The chemical reagent solutions are pumped from a reservoir, mixed in controlled amounts, and then pumped into a bottom array of reaction cells. The array may be decoupled from the assembly and removed for incubation or analysis.

The above described microfluidic pumping can be used as a printing apparatus. The chemical reagent solutions are replaced by dispersions or solutions of cyan, magenta, yellow or any specialty color colorants. The array of reaction cells may be considered a viewable display of picture elements, or pixels, comprising mixtures of colorants having the hue of the pixel in the original scene. When contacted with paper, the force of the paper fibers pulls the colorant from the cells and holds it in the paper, thus producing a paper print, or photograph, of the original scene.

One problem with microfluidic printing is in the excess amount of fluid being transferred to the receiving medium during printing. The inks can be aqueous or organic solutions or aqueous or organic dispersions. In the case of solutions, to avoid precipitation or phase separation, the concentrations of the inks are required to be below the solubility limits of the inks in the respective carrier solvent. For pigments, the concentration is dependent on the stability of the dispersion to prevent coalescence or the dispersed particulate. Typically, the concentrations for the colorant and the pigmented inks are below 10 wt % and 15 wt % respectively. Thus, for transferring a fixed amount of colorant to a receiving medium as required by the image, a large amount of carrier solvent need also to be absorbed by the receiving medium. This increases the ink absorbing materials to be coated on the receiver as well as the cost to the receiver. It also increases the time for the inks to dry on a receiving medium after printing.

SUMMARY OF THE INVENTION

An object of this invention is to provide high quality microfluidic printing which eliminates the need for providing inks and their attendant problems.

These objects are achieved by a method for microfluidic printing of colored images on a receiver, comprising the steps of:

a) providing a first set of reservoirs containing colorant precursors for different colors;

b) providing at least one reservoir containing a reactant; and c) reacting the colorant precursors and at least one reactant to provide colored pixels of the desired colors.

One feature of the present invention is that it can eliminate the need for inks and uses colorant precursors and reactants to provide high quality colored images.

Another feature of the present invention is that the invention microfluidic printing methods permit printing on a wider variety of receiver medium.

DETAILED DESCRIPTION OF THE INVENTION

The present invention is described in relation to a microfluidic printing apparatus which can print computer generated images, graphic images, line art, text images and the like, as well as continuous tone images.

Figure 1:
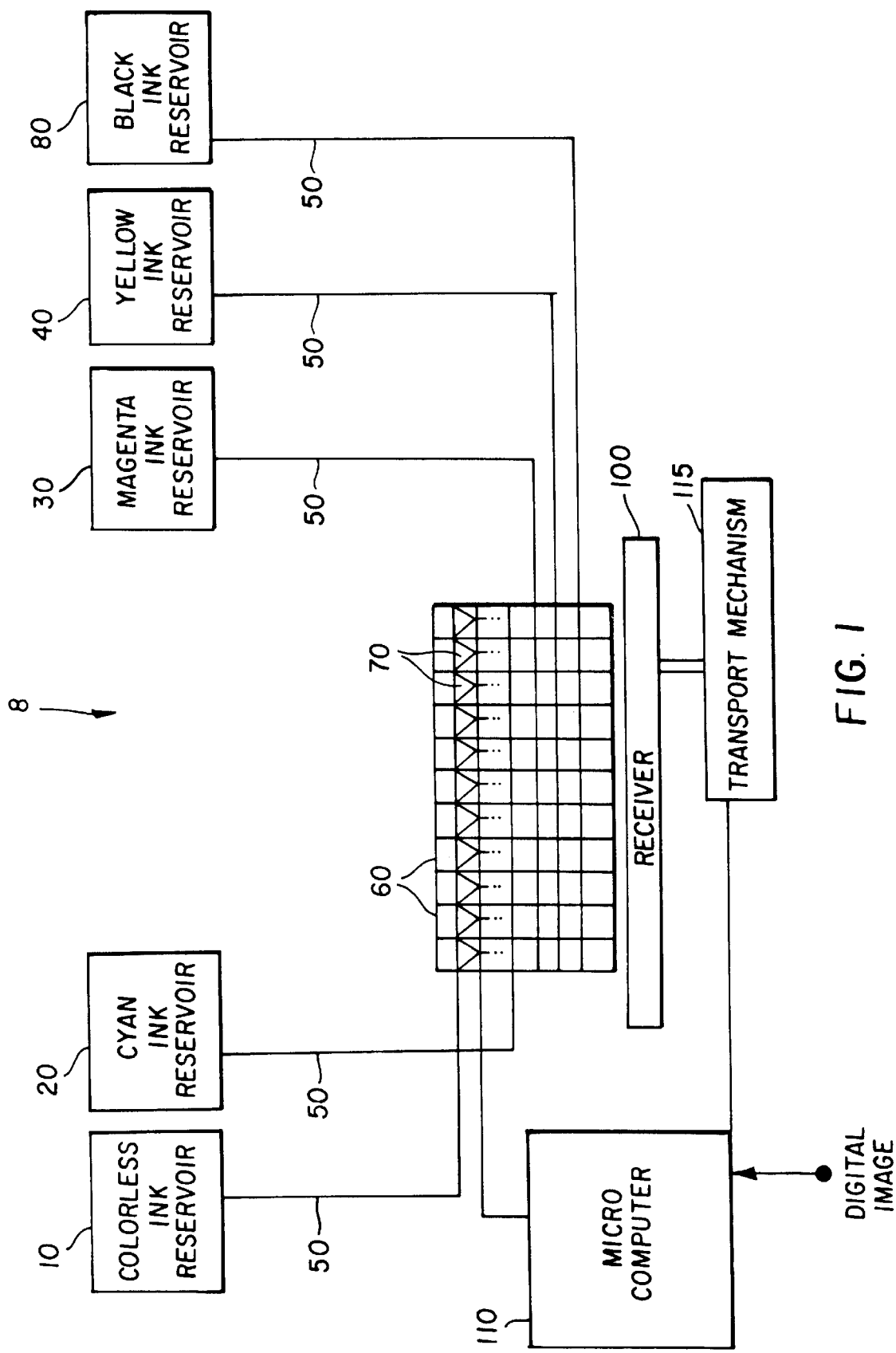
FIG. 1 is a partial schematic showing an apparatus for pumping the colorant precursors, reacting the colorant precursors, and printing onto a receiver.
Figure 3:
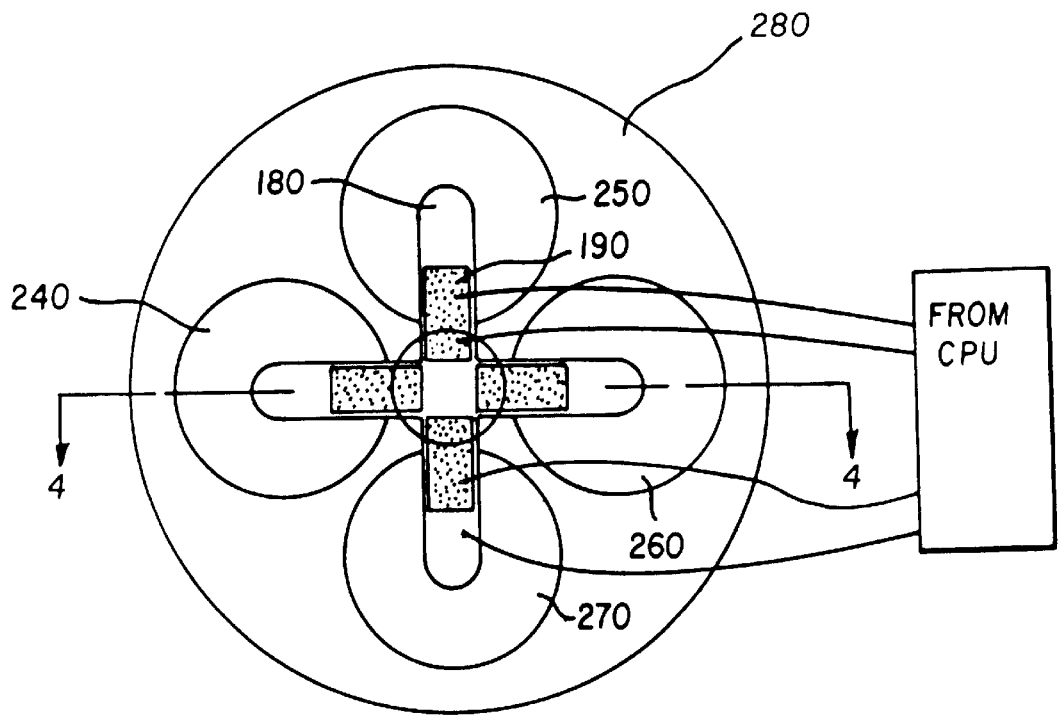
FIG. 3 is a detailed plan view of reacting chambers of the microfluidic printing apparatus in the present invention.
Figure 4:
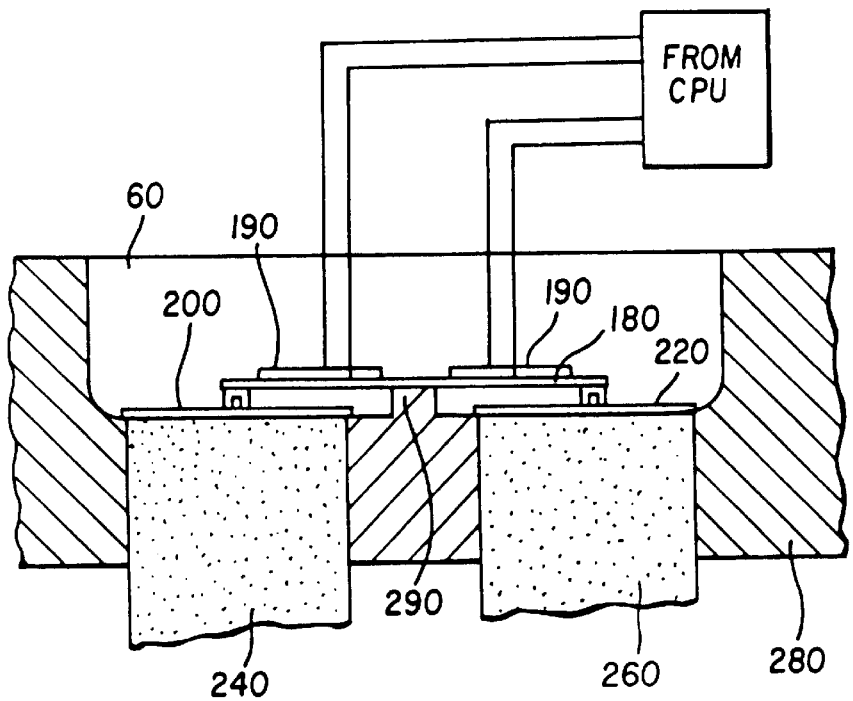
FIG. 4 is a cross-sectional view taken along the lines 4—4 of FIG. 3 and showing closed microvalves.
Figure 5:
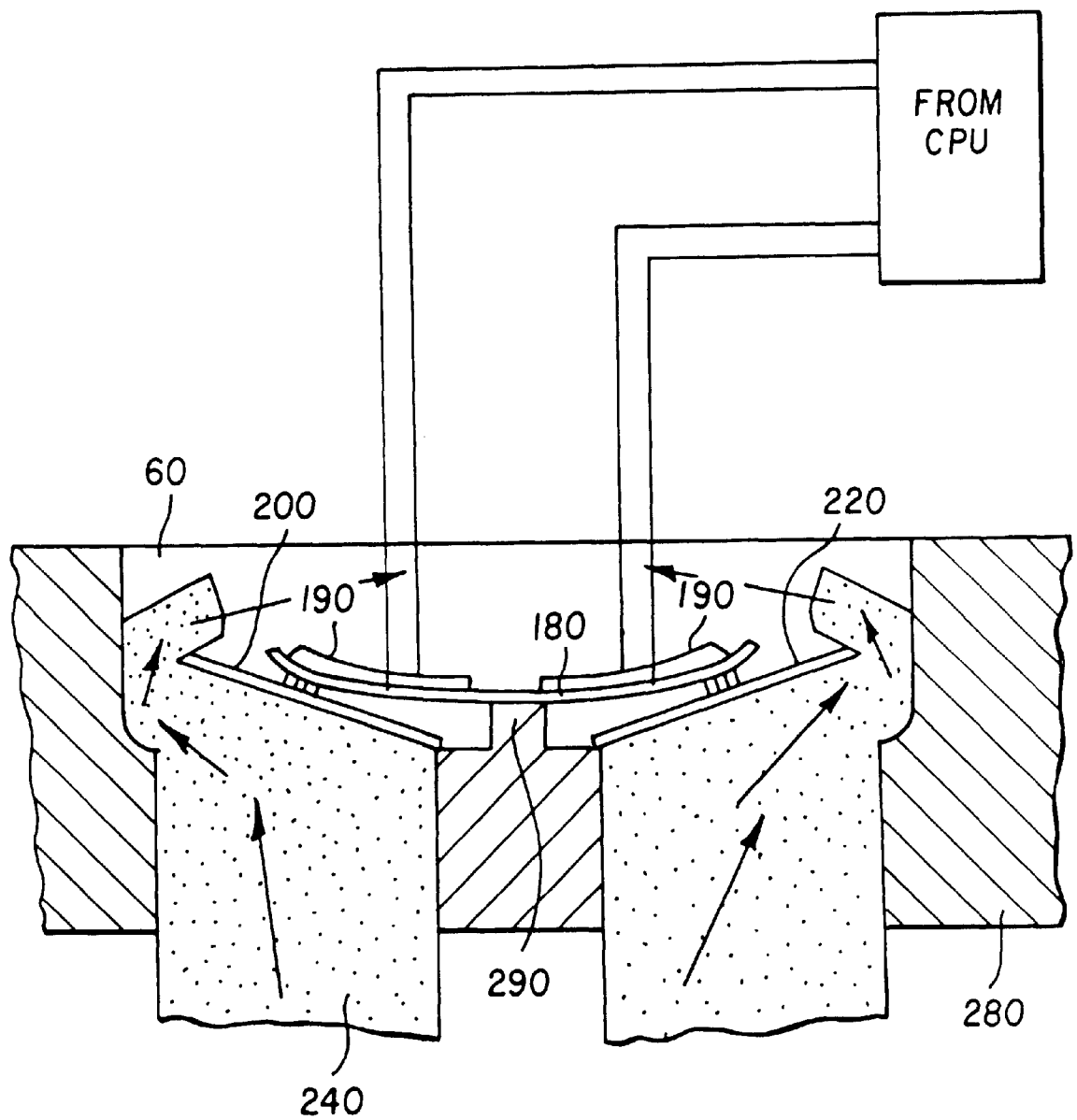
FIG. 5 is a cross-sectional view similar to that of FIG. 4 with the microvalves shown in closed position.

Referring to FIG. 1, a schematic diagram is shown of the method of printing. Reservoirs are shown for colorant reactants 10, cyan colorant precursor 20, magenta colorant precursor 30, and yellow colorant precursor 40. More reservoirs can be added to expand the color gamut, for example by adding an orange and a green precursor chamber as well. There may be included an optional reservoir 80 for black ink. Microchannels 50 are shown to conduct the colorant precursors and the colorant reactants from the respective reservoirs to the reacting chambers 60. The amounts of colorant precursor and common colorant reactant delivered are controlled by electrokinetic pumps 70, which are only shown for the reactant channel. Similar pumps are used for the colorant precursor channels, which are shown in FIGS. 3–5, but are omitted from this figure for clarity. The common colorant reactant reacts with the colorant precursors by chemical binding, complexation, association, and other reactions to form pixels of the desired hue and saturation. The densities are controlled by the ratio of the colorant precursor to reactant metered to the chamber, as the reactant can also serve as the diluent. An additional chamber can be added to meter a separate diluent if desired, especially useful if the reactant is colored. Finally, a reflective receiver 100 is shown to accept the pixels formed by the chemical reactions and thereby produce the print. When the term "colored pixel" is used, it will be understood to include materials delivered which has the desired color. In addition to which the reactant materials in the reacting chambers 60 will also be referred to as colored pixels. Although a reflective receiver is described in this embodiment, it will be understood that other receivers, such as those which have transparent supports, can be used.

Figure 2:
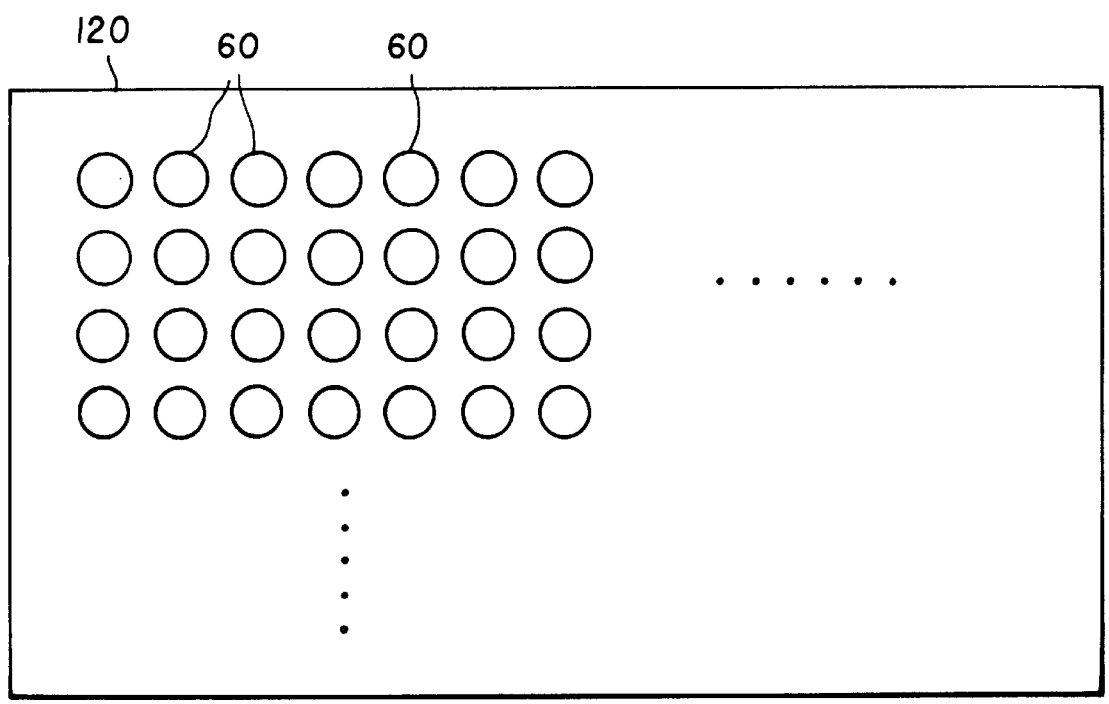
FIG. 2 is a top view of the pattern of the color pixels described in the present invention.

FIG. 2 depicts a top view of the arrangement of reacting chambers 60 shown in FIG. 1. Each reacting chamber 60 is capable of producing colorants having any color saturation, hue and lightness within the color gamut provided by the set of colorant precursors and colorant reactants used in the apparatus.

In the present invention, the term colorant precursor can include, for example, colorant precursors, colorant couplers, colorant developers, ligands and leuco dyes which can react with a reactant to form the correct color species which has a desired color. This species is, of course, a colorant. The colorant precursors can be colorless or colored. The reactant can be any of a wide range of chemistries. The reactant can be colored or colorless. If it is colored, a separate diluent chamber can be added to control densities. The diluent can either be a aqueous or organic solvent The desired colors for printing are formed through the chemical reaction in the reacting chamber.

In one example, the reactant can contain metal ions which can complex with the appropriate ligands to form the colorants. The hue, saturation and lightness can be controlled by selection of the appropriate ligands to form the metal complex colorant. Examples of the chemistries have been published by "Analytical Applications of a 1,10-Phenenthroline and Related Compounds," A. Schilt, Pergammon Press, 54(1969) and "Theory and Structure of Complex Compounds," P. Krumholz, Oxford:Pergamon Press, 217 (1964). These chemistries have been incorporated in conventional photographic elements as demonstrated by U.S. Pat. No. 4,555,478. Depending on the metal selected, the oxidation state of the metal can be maintained by either a reduction potential to maintain the reduced form (example $Fe^{2+}$ maintained from oxidizing to $Fe^{3+}$) or by oxygen deprivation. The ligands are very soluble, allowing for very high loading in their solute. The metal complex formed becomes virtually insoluble, especially if the complexing metal is attached to an organic moiety, for example, such as described in U.S. Pat. No. 4,568,633, or a polymeric species. Ejection of the colorant drop prior to insolubilization is allowed by the short time duration in the chamber of the supersaturated solution. More specifically, as shown in Table 1, a series of ligands are shown which can react with metal ions to form colored complexes. This example is shown for illustrative purposes only and does not limit the range of possible complexations or colorants. Examples of compounds that form colorants upon complexation with metal ions include hydrazones, tetrazolyl pyridines, benzimidazoles, pyridyl quinazolines, bis-isoquinolines, imines, oximes, phenanthrolines, bipyridines, terpyridines, bidiazines, pyridyl diazines, pyridyl benzimidazoles, triazines, diazyl-triazines, o-nitroso anilines and phenols, tetrazines, and quinazolines, imidazoles, triazolines and thiazolines to mention a few.

TABLE 1

| Ligand | Metal Ion | Color |
|---|---|---|
| (structure with HO, R, O, R, N=N, pyridine) | $Ni^{2+}$ | Yellow |
| (isoquinoline with NHNH₂, NH) | $Fe^{2+}$ | Yellow |
| (pyridine with R, R′, NOH) | $Fe^{2+}$ | Magenta |

TABLE 1-continued

| Ligand | Metal Ion | Color |
|---|---|---|
| 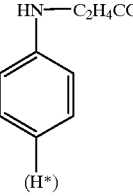 | $Fe^{2+}$ | Cyan |
| 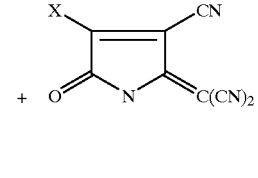 | $Fe^{2+}$ | Orange |
| 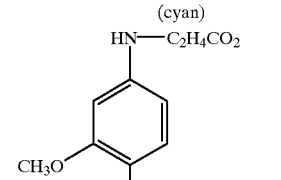 | $Fe^{2+}$ | Green |

R and R' can be H, substituted or unsubstituited alkyl, aryl cycloalkyl, aryloxy, alkoxy, heterocyclyl or vinyl groups.

The complexed structures were not drawn, but the metal chromophore visible absorption arises from a metal to ligand charge transfer transition, as detailed in the above cited references.

In other examples, reacting an electrophile with a coupler compound can form a dye. These chemistries have been successfully demonstrated in thermal printing with the in-situ formation of arylidene dyes in U.S. Pat. No. 5,011,811. More specifically, as shown in Table 2 below, there is shown a series of reactants to form colorants. In Table 2, the colorant precursors are electrophilic and the reactant is an arylidene coupler. The reaction produces dyes of the desired color.

TABLE 2

| Reactant | Colorant Precursors | Colorants (Dyes) |
|---|---|---|
| 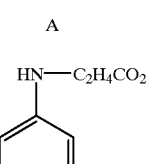<br>A | 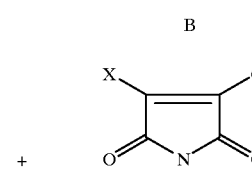<br>B | (cyan)<br>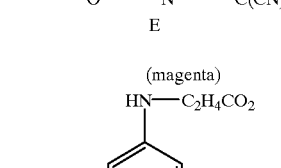<br>E |
| A | C | (magenta)<br>F |

TABLE 2-continued

| Reactant | Colorant Precursors | Colorants (Dyes) |
|---|---|---|
| (structure A): 3-methoxy-4-H, N-substituted with C₂H₄CO₂ aniline | (structure D): X, Cl, CN, CN substituted ethylene | (yellow) (structure G): arylidene dye |

In another example shown in Table 3, a common electrophile reactant reacts with different colorant precursors, which, in this case, are arylidene couplers to form yellow, magenta and cyan colorants, which in this case are arylidene dyes.

TABLE 3

| Reactant | Colorant Precursors | Color (Dye) |
|---|---|---|
| (structure C): X-substituted cyanomaleimide | (structure I): N-methylpyrrole | (yellow) (structure J) |
| (structure C): X-substituted cyanomaleimide | (structure K): HN—C₂H₄CO₂F₂H₅ substituted, OCH₃ substituted aniline | (magenta) (structure L): HN—C₂H₄CO₂C₂H₅, OCH₃ substituted arylmaleimide |

TABLE 3-continued

| Reactant | Colorant Precursors | Color (Dye) |
|---|---|---|
| 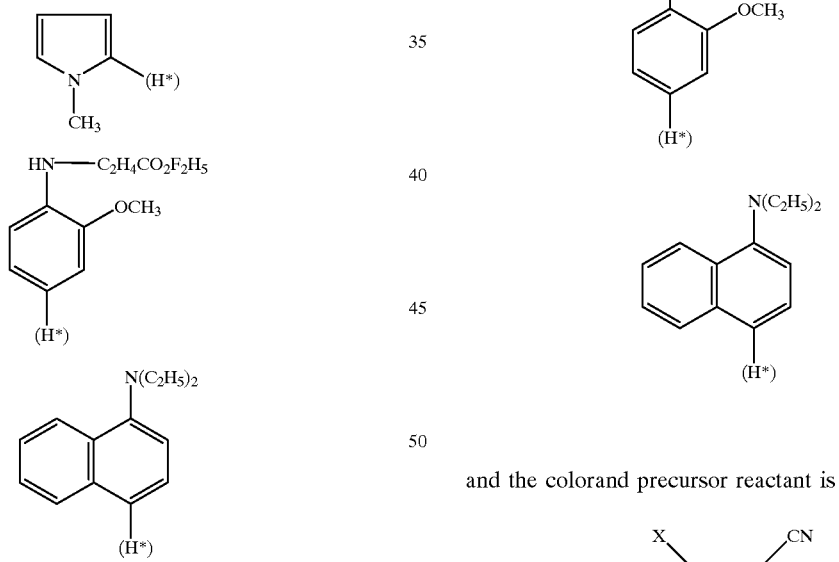 | | |
| C | M | N |

In accordance with the present invention, the precursor and reactant can be either the electrophile or the coupler. By using a coupler and an electrophile, the solubility limit of the half colorant molecule in the solvent will be significantly higher than that of the fully formed colorant, allowing for higher solute loading in the solvent. This in turn permitting for using less fluid, reducing the system drying constraints and costs.

which respectively react to form cyan, magenta, and yellow colors. The reactant arylidene couplers also include and the colorand precursor reactant is

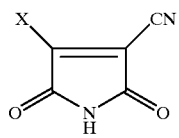

which respectively react to form cyan, magenta, and yellow colors.

In a further example, color formation can be generated by the reaction of a stable diazonium salt and a separate stable coupler. The stable diazonium component can be delivered via microfluidic pump or microvalve controlled channels to a reaction chamber to mix with a stable coupler. The reaction and the color and precursor reactant is

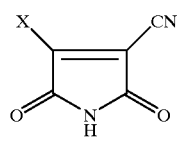

of diazo salt with coupler is diffusion controlled as in the earlier examples, therefore is extremely fast with high conversion.

An example of diazonium coupler reactions to provide the primary subtractive colors of yellow, magenta and cyan is illustrated in Table 4.

specialty colors. U.S. Pat. No. 4,022,617 discloses the use of leuco dyes (or leuco base dyes) in photothermographic emulsions. Additional leuco dyes that are useful include those disclosed in U.S. Pat. Nos. 5,364,415; 5,492,804; and 5,492,805. The leuco form of the dye, which typically is

TABLE 4

| Diazonium salt | Coupler | Dye | Color |
|---|---|---|---|
|  |  |  | Yellow |
|  |  |  | Magenta |
|  |  |  | Cyan |

X can be $BF_4^-$, a tosylate, a halide or any other salt;

R can be H, substituted or unsubstituted alkyl, aryl cycloalkyl, aryloxy, alkoxy, heterocyclyl or vinyl groups.

The dyes in Table 4 are examples of stable, highly colored azo dyes that can be formed in the reaction chambers.

Stable colorants can also be formed from leuco precursors in the mixing chambers to generate yellow, magenta, cyan or virtually colorless, is oxidized either by electrical potential or by metal ions to form the stable colorant. In another embodiment of this system, the oxidant (reactant) can be in the receiver element allowing the color formation to take place after drop ejection on the receiver. In this case the mixing chamber is used to pre-mix the proper balance of leuco dyes (i.e. C,M and Y) to then be delivered to the receiver. Table 5 provides practical examples.

TABLE 5

| Leuco Form | Oxidant | Color |
|---|---|---|
| 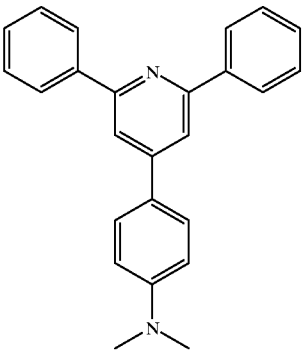 | $Zn^{2+}$ | Yellow |
| 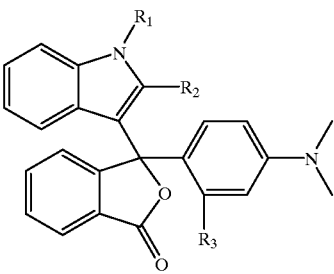 | $Zn^{2+}$ | Cyan |

$R_1$, $R_2$ and $R_3$ can be H, substituted or unsubstituted alkyl, aryl cycloalkyl, aryloxy, alkoxy, heterocyclyl or vinyl groups.

It is understood that the above description is only intended to be an example of many possible chemistries that can be used in the present invention. For example, the chemistries disclosed in U.S. Pat. Nos. 5,414,091; 5,443,945; and 5,455,140 can be incorporated into the present invention. Other examples of related chemical systems can be found in "Analytical Applications of a 1,10-Phenenthroline and Related Compounds," A Schilt, Pergammon Press, 54(1969) and "Theory and Structure of Complex Compounds," P. Krumholz, Oxford:Pergamon Press, 217 (1964). Furthermore, the colors formed by the colorant precursors are also not limited by the above examples. For instance, red, green, blue, orange or violet colorant precursors can also be included to form the respective colors, as disclosed by example in U.S. Pat. No. 5,011,811.

FIG. 3 shows a detailed plan view of the reacting chamber of microfluidic printing apparatus in the present invention. FIG. 4 is a cross-sectional view of the reacting chamber as shown in FIG. 3 with closed microvalves. FIG. 5 is a cross-sectional view of the reacting chamber as shown in FIG. 3 with opened microvalves. For clarity of illustration, the black ink flow channel is not shown in FIGS. 3–5. Each reacting chamber 60 is fabricated in a substrate 280. The substrate can be made of semiconductor such as silicon, glass, or metallic materials. Each reacting chamber 60 is connected to microchannels 240, 250, 260 and 270 for colorant reactant, and cyan, magenta and yellow colorant precursors respectively. The microchannels 240, 250, 260 and 270 are each connected to a respective electrokinetic pump which delivers colorant reactants and colorant precursors from the corresponding reservoirs 10, 20, 30, 40 (FIG. 1). A microbeam 180, supported by a microbeam support 290, is attached to the micro-shutters for each colorant reactant or colorant precursor (such as the microchannels 240 and 260 for colorant reactant and magenta colorant precursors). The microbeams 180 are attached to piezo plates 190 with each piezo plate 190 controlling the deflection of the corresponding microbeam 180 and thus the opening and closing of the corresponding micro-shutter (200, 220, etc.). In FIG. 4, the microchannels 240 and 260 are shown in a closed state with the piezo plates 190 inactivated and the microbeams 180 undeflected. In FIG. 5, the piezo plates 190 are activated in a bend mode, the microbeams 180 deflected, and the micro-shutters 200 and 220 are in an open state.

Many other types of microvalves can be used for the present invention. One example is a microvalve comprising a bimetallically driven diaphragms as described in p26 Sensor, September, 1994. Other types of microvalves are disclosed in U.S. Pat. Nos. 5,178,190; 5,238,223; 5,259,737; 5,367,878; and 5,400,824. Disclosures are also made in above referenced commonly assigned U.S. patent application Ser. No. 08/868,416, filed Jun. 3, 1997, in the name of Wen et al.

The typical printing operation in the present invention involves the following steps. First the printer receives a digital image file consisting of electronic signals in which the color code values are characterized by bit depths of an essentially continuous tone image, for example, 8 bits per color per pixel. The color code values at each pixel, which define the lightness, hue and color saturation at the pixel. In the default non-printing mode, the micro-shutters 200, 220, etc. are closed. This prevents solutions of colorant reactant and colorant precursors from drying up at the outlets of the microchannels which often causes kogation problems in the microchannels. When the printing command is received by the printer, electric activation pulses are sent to bend the piezo plates 190 and deflect the microbeam 180, and open up the microshutters such as 200, 220, etc. for the microchannels 240, 250, 260 and 270 for each colorant coupler and colorant precursor. The electrokinetic pumps connected to the corresponding microchannels 240, 250, 260, and 270 around each reacting chamber 60 pump the designated cyan, magenta, yellow colorant precursors and the colorant reactant solutions in an amount corresponding to the code values at the pixel from the reservoirs 20, 30, 40 and 80, into the reacting chamber 60. Again, the black ink can be included for appropriate printing applications. The precise control of the color densities permit a continuous-tone images to be printed on the receiving medium.

After the correct amounts of the colorant reactants and the colorant precursors are delivered, the micro-shutters such as 200 and 220 are closed and the colorant reactants and precursors react to form the colorant molecule or complex (herein referred to as formed colorant). The final concentrations of the formed colorant formed correspond to the required values at the respective pixels in the original image being printed. The final ink solution comprising the mixture of formed colorant is held in the reacting chamber 60 by the surface tension. A reflective receiver 100 is subsequently placed in contact with the ink meniscus of the reacting chamber within the printer front plate 120. The ink mixture contained in the reacting chamber 60 is then transferred to the reflective receiver by capillary-action forces in the pores in the receiver. Since the ink mixture in reacting chamber 60 are shut off from the microchannels connected to the printing apparatus, the amount of the ink transfer is no longer sensitive to the contact tine. In addition, because the ink mixture in reacting chamber 60 is isolated, the requirement on the receiver type is much relaxed; as a result, receiver media with thinner (or no) coated absorbing layers can be used.

A separate black ink reservoir 80 can be included in the printing apparatus in the present invention. The black inks can be delivered by separate ink delivery chambers, or delivered to the reacting chambering to mix with the colorants, before the colorants are transferred to the receiving medium.

The invention has been described in detail with particular reference to certain preferred embodiments thereof, but it will be understood that variations and modifications can be effected within the spirit and scope of the invention. For example, colorants produced in accordance with the present invention can be mixed to produce different colors.

PARTS LIST

10 reservoir for colorant reactant
20 reservoir for cyan colorant precursor
30 reservoir for magenta colorant precursor
40 reservoir for yellow colorant precursor
50 microchannel
60 reacting chambers
70 electrokinetic pumps
80 black ink reservoir
100 reflective receiver
120 printer front plate
180 microbeam
190 piezo plate
200 micro-shutter for colorant reactant
220 micro-shutter for magenta colorant precursor
240 microchannel for colorant reactant
250 microchannel for cyan colorant precursor
260 microchannel for magenta colorant precursor
270 microchannel for yellow colorant precursor
280 substrate
290 microbeam support

What is claimed is:

1. In a method for microfluidic printing of colored images on a receiver, comprising the steps of:

a) providing a first set of reservoirs containing colorant precursors for different colors;

b) providing at least one reservoir containing a reactant; and c) reacting the colorant precursors and reactant(s) in a reacting chamber to provide colorants of the desired colors.

2. A method for microfluidic printing of colored images on a receiver, comprising the steps of:

a) providing a first set of reservoirs containing colorant precursors for different colors;

b) providing at least one reservoir containing a reactant;

c) reacting the colorant precursors and reactant(s) in a reacting chamber to provide colorants of the desired colors; and d) transferring the colorants to the receiver.

3. The method of claim 2 wherein the colorant precursors are ligands and the reactant(s) is a metal ion which together form colored metal complexes.

4. The method of claim 2 wherein the colorant precursors are arylidene couplers and reactant(s) is an electrophile.

5. The method of claim 2 wherein the colorant precursors are electrophiles and reactant(s) is an arylidene coupler.

6. The method of claim 4 wherein the reactant arylidene couplers are

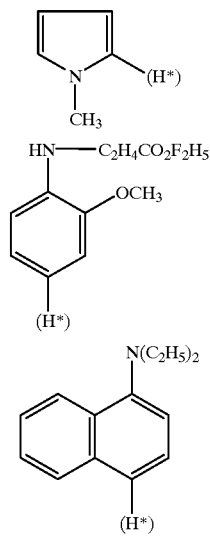

and the colorant precursor reactant is

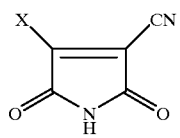

which respectively react to form cyan, magenta, and yellow colors.

7. The method of claim 5 wherein the colorant precursor electrophiles are

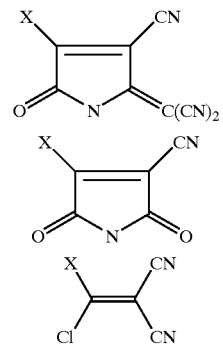

and the reactant arylidene coupler is

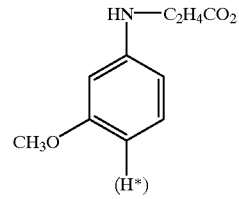

which respectively react to form cyan, magenta, and yellow colors.

8. The method of claim 3 wherein the colorant precursors are couplers and the reactant is a diazonium salt.

9. A method for microfluidic printing of colored images on a receiver, comprising the steps of:

a) providing a first set of reservoirs containing colorant precursors for different colors;
b) providing at least one reservoir containing a reactant;
c) providing a plurality of reacting chambers in which the colorant precursors and reactant(s) react to form desired colors;
d) delivering colorant precursors and reactant(s) to the reacting chamber where they react to form colorants having the desired colors; and
e) transferring color pixels to the receiver.

10. A method for microfluidic printing of colored images on a receiver, comprising the steps of:
a) providing a first set of reservoirs containing colorant precursors for different colors;
b) providing at least one reservoir containing a reactant;
c) providing a plurality of reacting chambers in which the colorant precursors and reactant(s) to form desired colors;
d) delivering the colorant precursors and at least one reactant into the reacting chambers where they form colored pixels of the desired colors; and
e) transferring color pixels to the receiver.

11. The method of claim 9 wherein the colorant precursors are ligands and the reactant(s) is a metal ion which together form colored metal complexes.

12. The method of claim 9 wherein the colorant precursors are arylidene couplers and the at least one reactant is an electrophile.

13. The method of claim 9 wherein the colorant precursors are electrophiles and the at least one reactant is an arylidene coupler.

14. The method of claim 9 wherein the reactant arylidene couplers are

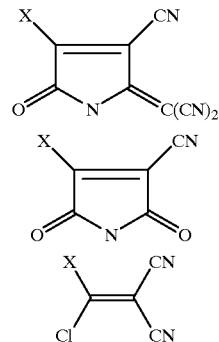

and the colorant precursor reactant is

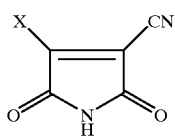

which respectively react to form cyan, magenta, and yellow colors.

15. The method of claim 9 wherein the colorant precursor electrophiles are

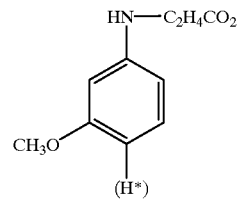

and the reactant arylidene coupler is

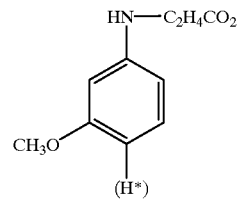

which respectively react to form cyan, magenta, and yellow colors.

16. The method of claim 9 wherein the colorant precursors are couplers and the reactant is a diazonium salt.

17. A method for microfluidic printing of colored images on a receiver, comprising the steps of:
a) providing a first set of reservoirs containing colorant precursors for different colors;
b) providing at least one reservoir containing a reactant;
c) providing a plurality of reacting chambers in which the colorant precursors and reactant(s) react to form desired colors;
d) delivering the appropriate amount of the colorant precursors and at least one reactant into the reacting chambers where they form colored pixels of the desired colors; and
e) transferring the appropriate amount of colorants to form image pixels.

18. The method of claim 9 further including a black ink reservoir and the step of transferring the black ink to the reservoir to the receiver.

19. A method for microfluidic printing of colored images on a receiver, comprising the steps of:
a) providing a first set of reservoirs containing colorant precursors for different colors;
b) providing at least one reservoir containing a reactant;
c) providing a plurality of reacting chambers in which the colorant precursors and reactants react to form colorants of different colors;
d) delivering the appropriate amount of the colorant precursors and reactant(s) into the reacting chambers where they form colorants of the desired colors; and e) transferring colorants to the receiver to form colored image pixels.

20. The method of claim 17 wherein the colorant precursors are ligands and the reactant(s) is a metal ion which together form colored metal complexes.

21. The method of claim 17 wherein the colorant precursors are arylidene couplers and the at least one reactant is an electrophile.

22. The method of claim 17 where the colorant precursors are couplers and the reactant is a diazonium salt.

* * * * *